United States Patent
Goel

(10) Patent No.: US 11,323,413 B2
(45) Date of Patent: *May 3, 2022

(54) METHODS, SYSTEMS, AND COMPUTER READABLE MEDIA FOR ACTIVELY DISCOVERING AND TRACKING ADDRESSES ASSOCIATED WITH 4G SERVICE ENDPOINTS

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,553

(22) Filed: Oct. 19, 2020

(65) Prior Publication Data

US 2021/0067485 A1 Mar. 4, 2021

Related U.S. Application Data

(63) Continuation-in-part of application No. 16/555,817, filed on Aug. 29, 2019, now Pat. No. 11,082,393.

(51) Int. Cl.
*G06F 15/16* (2006.01)
*H04L 61/5007* (2022.01)
(Continued)

(52) U.S. Cl.
CPC .......... *H04L 61/2007* (2013.01); *H04L 61/10* (2013.01); *H04L 61/1511* (2013.01); *H04W 80/04* (2013.01)

(58) Field of Classification Search
CPC . H04L 61/2007; H04L 61/1511; H04L 61/10; H04W 80/04
See application file for complete search history.

(56) References Cited

U.S. PATENT DOCUMENTS 5,381,413 A  1/1995 Tobagi et al.
6,748,435 B1  6/2004 Wang et al.
(Continued)

FOREIGN PATENT DOCUMENTS

CN  105635345 B  2/2019
CN  109788078 A  5/2019
(Continued)

OTHER PUBLICATIONS

Advisory Action for U.S. Appl. No. 16/356,446 (dated Dec. 22, 2020).

(Continued)

*Primary Examiner* — Cheikh T Ndiaye
(74) *Attorney, Agent, or Firm* — Jenkins, Wilson, Taylor & Hunt, P.A.

(57) ABSTRACT

A method for discovering and tracking addresses associated with 4G service endpoints includes receiving, from a requesting node, a first domain name system (DNS) resolution or monitoring request including a fully qualified domain name (FQDN) of a 5G service endpoint. The method further includes querying a DNS server using the FQDN from the first DNS resolution request. The method further includes receiving, from the DNS server, a first response including an address associated with the 4G service endpoint and storing the address associated with the 4G service endpoint in a database. The method further includes communicating the address associated with the 4G service endpoint to the requesting node. The method further includes monitoring the FQDN for changes in address associated with the FQDN. The method further includes notifying the requesting node of the changes in address associated with the FQDN.

18 Claims, 9 Drawing Sheets

(51) Int. Cl.
*H04L 61/4511* (2022.01)
*H04L 61/10* (2022.01)
*H04W 80/04* (2009.01)

(56) References Cited

U.S. PATENT DOCUMENTS

| | | | |
|---|---|---|---|
| 7,782,776 | B2 | 8/2010 | Shankar et al. |
| 8,023,482 | B2 | 9/2011 | Gong et al. |
| 8,300,637 | B1 | 10/2012 | Bennett, III et al. |
| 8,645,565 | B2 | 2/2014 | Sparks et al. |
| 8,811,228 | B2 | 8/2014 | Lopez et al. |
| 8,879,431 | B2 | 11/2014 | Ridel et al. |
| 8,954,080 | B2 | 2/2015 | Janakiraman et al. |
| 9,246,762 | B1 | 1/2016 | Watkins |
| 9,667,590 | B2 | 5/2017 | Yan et al. |
| 10,097,504 | B2 | 10/2018 | Backholm |
| 10,285,155 | B1 | 5/2019 | Dodd-Noble et al. |
| 10,299,128 | B1 | 5/2019 | Suthar et al. |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,609,530 | B1* | 3/2020 | Patil ................. H04L 67/16 |
| 10,616,934 | B2 | 4/2020 | Talebi Fard et al. |
| 10,637,753 | B1 | 4/2020 | Taft et al. |
| 10,652,098 | B2 | 5/2020 | Kim |
| 10,772,062 | B1 | 9/2020 | Albasheir et al. |
| 10,778,527 | B2 | 9/2020 | Assali et al. |
| 10,791,044 | B1 | 9/2020 | Krishan et al. |
| 10,819,636 | B1 | 10/2020 | Goel |
| 10,880,370 | B2 | 12/2020 | Seenappa et al. |
| 11,082,393 | B2 | 8/2021 | Goel |
| 2003/0174649 | A1 | 9/2003 | Shankar et al. |
| 2003/0223414 | A1 | 12/2003 | Wong |
| 2004/0003069 | A1 | 1/2004 | Wong |
| 2004/0141473 | A1 | 7/2004 | Buot |
| 2004/0208183 | A1 | 10/2004 | Balachandran et al. |
| 2005/0193096 | A1 | 9/2005 | Yu et al. |
| 2006/0010224 | A1 | 1/2006 | Sekar et al. |
| 2007/0242738 | A1 | 10/2007 | Park et al. |
| 2009/0055835 | A1 | 2/2009 | Zhu |
| 2009/0141625 | A1 | 6/2009 | Ghai et al. |
| 2009/0222584 | A1 | 9/2009 | Josefsberg et al. |
| 2011/0078674 | A1 | 3/2011 | Ershov |
| 2011/0202604 | A1 | 8/2011 | Craig et al. |
| 2013/0029708 | A1 | 1/2013 | Fox et al. |
| 2013/0039176 | A1 | 2/2013 | Kanode et al. |
| 2013/0198269 | A1 | 8/2013 | Fleischman et al. |
| 2013/0272123 | A1 | 10/2013 | Lee et al. |
| 2014/0040975 | A1 | 2/2014 | Raleigh et al. |
| 2014/0379901 | A1 | 12/2014 | Tseitlin et al. |
| 2015/0016266 | A1 | 1/2015 | Dumitrescu et al. |
| 2015/0071074 | A1 | 3/2015 | Zaidi et al. |
| 2015/0263987 | A1 | 9/2015 | Klein et al. |
| 2016/0142324 | A1 | 5/2016 | Vihtari et al. |
| 2016/0156513 | A1 | 6/2016 | Zhang et al. |
| 2016/0164788 | A1 | 6/2016 | Goel et al. |
| 2016/0183156 | A1 | 6/2016 | Chin et al. |
| 2016/0234119 | A1 | 8/2016 | Zaidi et al. |
| 2016/0315743 | A1 | 10/2016 | Nagaraj et al. |
| 2016/0344635 | A1 | 11/2016 | Lee et al. |
| 2016/0352588 | A1 | 12/2016 | Subbarayan et al. |
| 2016/0380906 | A1 | 12/2016 | Hodique et al. |
| 2017/0187673 | A1* | 6/2017 | Kaliski, Jr. ......... H04L 61/1511 |
| 2017/0221015 | A1 | 8/2017 | June et al. |
| 2018/0039494 | A1 | 2/2018 | Lander et al. |
| 2018/0083882 | A1 | 3/2018 | Krishan et al. |
| 2018/0159780 | A1 | 6/2018 | Essigmann et al. |
| 2018/0183724 | A1 | 6/2018 | Callard et al. |
| 2018/0213391 | A1 | 7/2018 | Inoue |
| 2018/0230556 | A1* | 8/2018 | Patterson ................. G16Z 99/00 |
| 2018/0262625 | A1 | 9/2018 | McCarley et al. |
| 2018/0285794 | A1 | 10/2018 | Gray-Donald et al. |
| 2018/0324247 | A1 | 11/2018 | Hood et al. |
| 2018/0324646 | A1 | 11/2018 | Lee et al. |
| 2018/0343567 | A1 | 11/2018 | Ashrafi |
| 2019/0007366 | A1 | 1/2019 | Voegele et al. |
| 2019/0036871 | A1* | 1/2019 | Lapidous ............ H04L 63/0281 |
| 2019/0045351 | A1 | 2/2019 | Zee et al. |
| 2019/0075552 | A1 | 3/2019 | Yu et al. |
| 2019/0116486 | A1 | 4/2019 | Kim et al. |
| 2019/0116521 | A1 | 4/2019 | Qiao et al. |
| 2019/0140895 | A1 | 5/2019 | Ennis, Jr. et al. |
| 2019/0158364 | A1 | 5/2019 | Zhang et al. |
| 2019/0173740 | A1 | 6/2019 | Zhang et al. |
| 2019/0174561 | A1 | 6/2019 | Sivavakeesar |
| 2019/0182875 | A1 | 6/2019 | Talebi Fard et al. |
| 2019/0191348 | A1 | 6/2019 | Futaki et al. |
| 2019/0191467 | A1 | 6/2019 | Dao et al. |
| 2019/0222633 | A1 | 7/2019 | Howes et al. |
| 2019/0223093 | A1 | 7/2019 | Watfa et al. |
| 2019/0230556 | A1 | 7/2019 | Lee |
| 2019/0238642 | A1* | 8/2019 | Sesham ............... H04L 61/1541 |
| 2019/0261244 | A1 | 8/2019 | Jung et al. |
| 2019/0268270 | A1 | 8/2019 | Fattah |
| 2019/0306251 | A1* | 10/2019 | Talebi Fard ............ H04L 67/12 |
| 2019/0306907 | A1 | 10/2019 | Andreoli-Fang et al. |
| 2019/0313236 | A1 | 10/2019 | Lee et al. |
| 2019/0313437 | A1 | 10/2019 | Jung et al. |
| 2019/0313469 | A1 | 10/2019 | Karampatsis et al. |
| 2019/0335002 | A1 | 10/2019 | Bogineni et al. |
| 2019/0335534 | A1 | 10/2019 | Atarius et al. |
| 2019/0342229 | A1 | 11/2019 | Khinvasara et al. |
| 2019/0342921 | A1 | 11/2019 | Loehr et al. |
| 2019/0349901 | A1 | 11/2019 | Basu Mallick et al. |
| 2019/0357092 | A1 | 11/2019 | Jung et al. |
| 2019/0380031 | A1 | 12/2019 | Suthar et al. |
| 2019/0394284 | A1 | 12/2019 | Baghel et al. |
| 2019/0394624 | A1 | 12/2019 | Karampatsis et al. |
| 2019/0394833 | A1 | 12/2019 | Talebi Fard et al. |
| 2020/0007632 | A1* | 1/2020 | Landais ................... H04L 67/16 |
| 2020/0008069 | A1 | 1/2020 | Zhu et al. |
| 2020/0028920 | A1* | 1/2020 | Livanos ................... H04W 8/26 |
| 2020/0029197 | A1* | 1/2020 | Tandon ............... H04L 61/3075 |
| 2020/0045753 | A1 | 2/2020 | Dao et al. |
| 2020/0045767 | A1 | 2/2020 | Velev et al. |
| 2020/0053670 | A1 | 2/2020 | Jung et al. |
| 2020/0053724 | A1 | 2/2020 | MolavianJazi et al. |
| 2020/0053828 | A1 | 2/2020 | Bharatia et al. |
| 2020/0059420 | A1 | 2/2020 | Abraham |
| 2020/0059856 | A1 | 2/2020 | Cui et al. |
| 2020/0076764 | A1* | 3/2020 | Robitzsch ............ H04L 67/2842 |
| 2020/0084663 | A1 | 3/2020 | Park et al. |
| 2020/0092423 | A1 | 3/2020 | Qiao et al. |
| 2020/0092424 | A1 | 3/2020 | Qiao et al. |
| 2020/0106812 | A1 | 4/2020 | Verma et al. |
| 2020/0127916 | A1 | 4/2020 | Krishan |
| 2020/0136911 | A1 | 4/2020 | Assali et al. |
| 2020/0137174 | A1 | 4/2020 | Stammers et al. |
| 2020/0177629 | A1 | 6/2020 | Hooda et al. |
| 2020/0305033 | A1 | 9/2020 | Keller et al. |
| 2020/0313996 | A1 | 10/2020 | Krishan et al. |
| 2020/0314615 | A1 | 10/2020 | Patil et al. |
| 2020/0336554 | A1 | 10/2020 | Deshpande et al. |
| 2020/0404608 | A1 | 12/2020 | Albasheir et al. |
| 2020/0412597 | A1 | 12/2020 | Goel et al. |
| 2021/0000723 | A1 | 1/2021 | Strand et al. |
| 2021/0007023 | A1 | 1/2021 | Umapathy et al. |
| 2021/0044481 | A1 | 2/2021 | Xu et al. |
| 2021/0067480 | A1 | 3/2021 | Goel |
| 2021/0105214 | A1 | 4/2021 | Goel |
| 2021/0204200 | A1 | 7/2021 | Krishan et al. |
| 2021/0235254 | A1 | 7/2021 | Farooq |
| 2021/0273977 | A1 | 9/2021 | Karasaridis et al. |
| 2021/0274392 | A1 | 9/2021 | Dao et al. |

FOREIGN PATENT DOCUMENTS

| | | |
|---|---|---|
| EP | 2 575 303 A1 | 4/2013 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |
| WO | WO 2019/076273 A1 | 4/2019 |

(56) References Cited

FOREIGN PATENT DOCUMENTS

| WO | WO 2019/144321 A1 | 8/2019 | |
| --- | --- | --- | --- |
| WO | WO-2019144321 A1 * | 8/2019 | ......... H04L 61/1541 |
| WO | WO 2019/220172 A1 | 11/2019 | |
| WO | WO 2020/091934 A1 | 5/2020 | |
| WO | WO 2020/263486 A1 | 12/2020 | |
| WO | WO 2021/040827 A1 | 3/2021 | |
| WO | WO 2021/055998 A1 | 3/2021 | |
| WO | WO 2021/138074 A1 | 7/2021 | |

OTHER PUBLICATIONS

Notice of Allowance and Fee(s) Due for U.S. Appl. No. 16/555,817 (dated Dec. 3, 2020).
Commonly-Assigned, co-pending Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances,".
Commonly-Assigned, co-pending U.S. Appl. No. 17/082,871 for "Methods, Systems, and Computer Readable Media for Rank Processing for Network Function Selection," (Unpublished, filed Oct. 28, 2020).
"P-GW Administration Guide, StarOS Release 21.20," Cisco, pp. 1-1164 (Oct. 11, 2020).
"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).
3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).
Commonly-assigned, co-pending U.S. Appl. No. 16/945,794 for "Methods, Systems, And Computer Readable Media For Preferred Network Function (NF) Location Routing Using Service Communications Proxy (SCP)" (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
"LTE and Beyond," https://ytd2525.wordpress.com/2013/03/06/lte-and-beyond/, 3 pages (2013).
International Search Report and Written Opinion for Patent Cooperation Treaty Application Serial No. PCT/US2020/061885 (dated Feb. 4, 2021).
International Search Report and Written Opinion for Patent Cooperation Treaty Application Serial No. PCT/US2020/057712 (dated Feb. 2, 2021).
Abley, J. et al., "A Mechanism for Remote-Triggered DNS Cache Flushes (DNS FLUSH) draft-jabley-dnsop-dns-flush-00", Internet Engineering Task Force (IETF), pp. 1-12 (Jun. 24, 2013).
Cheshire, S. et al., "Apple's DNS Long-Lived Queries protocol draft-sekar-dns-llq-06," Internet Engineering Task Force (IETF), pp. 1-26 (Aug. 23, 2019).
Final Office Action for U.S. Appl. No. 16/697,021 (dated Feb. 2, 2021).
Applicant-Initiated Interview Summary for U.S. Appl. No. 16/697,021 (dated Jan. 26, 2021).
Notification of Transmittal of the International Search Report and the Written Opinion of the International Searching Authority, or the Declaration for International Application Serial No. PCT/US2020/065765 (dated Apr. 15, 2021).
Ex Parte Quayle Action for U.S. Appl. No. 16/730,799 (dated Apr. 7, 2021).
Notice of Allowance and Fee(s) Due for U.S. Appl. No. 16/555,817 (dated Mar. 24, 2021).
Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Commonly-assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Sep. 23, 2020).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Non-Final Office Action for U.S. Appl. No. 16/697,021 (dated Sep. 29, 2020).
Final Office Action for U.S. Appl. No. 16/356,446 (dated Sep. 8, 2020).
Notice of Allowance and Fee(s) Due and Examiner-Initiated Interview Summary for U.S. Appl. No. 16/453,955 (dated Aug. 26, 2020).
Notification of the Transmittal of the International Search Report and the Written Opinion of the International Searching Authority, or the Declaration for International Application No. PCT/US2020/034723 (dated Aug. 17, 2020).
Non-Final Office Action for U.S. Appl. No. 16/555,817 (dated Aug. 7, 2020).
Notification of Transmittal of the International Search Report and the Written Opinion of the International Searching Authority, or the Declaration for International Application Serial No. PCT/US2020/035004 (dated Jul. 7, 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
Notification of Transmittal of the International Search Report and the Written Opinion of the International Searching Authority, or the Declaration for International Application Serial No. PCT/US2019/053912 (dated Dec. 18, 2019).
Commonly-Assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).

(56) References Cited

OTHER PUBLICATIONS

"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).

"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).

"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).

Cheshire et al., "Apple's DNS Long-Lived Queries protocol," Network Working Group, Apple, Inc., pp. 1-26 (Aug. 22, 2019).

"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).

"Class of Service Feature Guide (Routers and EX9200 Switches)," Junos® OS, Juniper Networks, pp. 1-1530 (Apr. 10, 2019).

"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).

Penttinen, "5G Explained: Security and Deployment of Advanced Mobile Communications," Chapter 6, Section 6.3.8 NRF, 2 pages (Feb. 2019).

"Oracle Communications Diameter Signaling Router," Release Notice, Release 8.3, E93179 Revision 02, Oracle, pp. 1-98 (Dec. 2018).

"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).

"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).

"Addressing 5G Network Function Requirements," Intel® FPGAs and Intel PAC 5G QoS and IPSec Benchmarking, White Paper, pp. 1-8 (Oct. 2018).

"CPS vDRA Configuration Guide," Release 18.3.0 (Restricted Release)(1), Cisco, pp. 1-130 (Sep. 14, 2018).

"How To Do Rate Limiting of Diameter Messages Using NetScaler," Citrix Systems Inc., pp. 1-3 (Sep. 4, 2018).

"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"5G; Procedures for the 5G System (3GPP TS 23.502 version 15.2.0 Release 15)," ETSI TS 123 502 V15.2.0, pp. 1-46 (Jun. 2018).

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).

Scholl et al., "An API First Approach to Microservices Development," Oracle, https://blogs.oracle.com/developers/an-api-first-approach-to-microservices-development, pp. 1-12 (Nov. 8, 2017).

Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).

"Pseudo-CR on Service Discovery and Registration using NRF service," Ericsson, 3GPP TSG CT4 Meeting #79, 3GPP TR 29.891-v0.3.0, pp. 1-4 (Aug. 21-25, 2017).

Carlton et al., "HTTP and DNS in a 5G World," https://www.computerworld.com/article/3204594/http-and-dns-in-a-5g-world.html, pp. 1-5 (Jun. 30, 2017).

Benacer et al., "A High-Speed Traffic Manager Architecture for Flow-Based Networking," pp. 1-4 (2017).

"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).

"Multi-Layer Security Protection for Signaling Networks," Oracle Communications, Oracle white paper, pp. 1-9 (Jan. 2016).

Kantola et al., "Policy-based communications for 5G mobile with customer edge switching," Security and Communication Networks, vol. 9, pp. 3070-3082 (2016).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Abley et al., "A Mechanism for Remote-Triggered DNS Cache Flushes (DNS Flush)," Network Working Group, Google, pp. 1-12 (Jun. 24, 2013).

Preston-Werner, "Semantic Versioning 2.0.0", Oracle, pp. 1-5 (Jun. 2013).

Fajardo et al., "Diameter Based Protocol," Internet Engineering Task Force (IETF) Request for Comments: 6733, pp. 1-152 (Oct. 2012).

Gulbrandsen et al, "A DNS RR for specifying the location of services (DNS SRV)," RFC 2782, pp. 1-12 (Feb. 2000).

Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).

Non-Final Office Action for U.S. Appl. No. 16/945,794 (dated Sep. 15, 2021).

Notice of Allowance and Fee(s) Due for U.S. Appl. No. 16/730,799 (dated Aug. 16, 2021).

Communication of European publication number and information on the application of Article 67(3) EPC for European Patent Application Serial No. 19791391.6 (dated Aug. 11, 2021).

Commonly-assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications Via Service Communications Proxy (SCP)" (Unpublished, filed Aug. 3, 2021).

Notice of Allowance and Fee(s) Due for U.S. Appl. No. 16/730,799 (dated Jul. 30, 2021).

(56) References Cited

OTHER PUBLICATIONS

Notification of Transmittal of the International Search Report and the Written Opinion of the International Searching Authority, or the Declaration for International Application No. PCT/US2021/024000 (dated Jun. 24, 2021).

Commonly-assigned, co-pending U.S. Appl. No. 17/356,451 for "Methods, Systems, and Computer Readable Media for Resolution of Inter-Network Domain Names" (Unpublished, filed Jun. 23, 2021).

Notification of Transmittal of the International Search Report and the Written Opinion of the International Searching Authority, or the Declaration for U.S. Patent Application No. PCT/US2021/020120 (dated Jun. 1, 2021).

Notification of Transmittal of the International Search Report and the Written Opinion of the International Searching Authority, or the Declaration for U.S. Patent Application No. PCT/US2021/020122 (dated Jun. 1, 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).

Nokia et al., "Discussion paper on authorization for Model D Indirect communications", 3GPP TSG SA WG3; S3-194380 (Nov. 11, 2019).

Notice of Allowance and Fee(s) Due for U.S. Appl. No. 16/697,021 (dated Jun. 21, 2021).

Non-Final Office Action for U.S. Appl. No. 16/356,446 (dated Jun. 16, 2021).

Notice of Publication for International Application Serial No. PCT/US2020/061885 (dated Jun. 3, 2021).

Notice of Allowance and Fee(s) Due for U.S. Appl. No. 17/001,599 (dated May 17, 2021).

Advisory Action for U.S. Appl. No. 16/697,021 (dated May 7, 2021).

Applicant-Initiated Interview Summary for U.S. Appl. No. 17/001,599 (dated May 5, 2021).

Huawei, "eSBA: reselection of producer instance," 3GPP TSG-SA2 Meeting #132, pp. 1-2 (Apr. 12, 2019).

Docomo, "Update Solution 4 for implicit registration," SA WG2 Meeting #129, pp. 1-2 (Oct. 15-19, 2018).

Notice of Allowance and Fee(s) Due for U.S. Appl. No. 17/102,404 (dated Oct. 7, 2021).

Notification of Transmittal of the International Search Report and the Written Opinion of the International Searching Authority, or the Declaration for International Application No. PCT/US2021/033031 (dated Sep. 16, 2021).

Notice of Allowance and Fee(s) Due for U.S. Appl. No. 16/356,446 (dated Sep. 30, 2021).

\* cited by examiner

METHODS, SYSTEMS, AND COMPUTER READABLE MEDIA FOR ACTIVELY DISCOVERING AND TRACKING ADDRESSES ASSOCIATED WITH 4G SERVICE ENDPOINTS

RELATED APPLICATIONS

This application is a continuation-in-part of U.S. patent application Ser. No. 16/555,817, filed Aug. 29, 2019, the disclosure of which is incorporated herein by reference in its entirety.

TECHNICAL FIELD

The subject matter described herein relates to discovering address information associated with service endpoints in a telecommunications network. More particularly, the subject matter described herein relates to methods, systems, and computer readable media for actively discovering and tracking addresses associated with 4G service endpoints.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destined producer NF.

One problem with the existing 3GPP service architecture is that a consumer NF or an SCP may have insufficient information to load balance traffic among service endpoints exposed by a producer NF service instance. In one scenario, a producer NF may only register its FQDN at the NF service level without individually registering domain names, IP addresses, or IP endpoints of producer NF services. In another scenario, a producer NF may only register its FQDN at the NF instance level without individually registering IP addresses or IP endpoints of services or FQDNs at the NF service level.

In either of these scenarios, the consumer NF or SCP must obtain the IP addresses or IP endpoints associated with the service endpoints to contact the individual service endpoints. In general, IP addresses or IP endpoints corresponding to domain names can be determined using the domain name system (DNS). In the 5G network architecture described above, service consumers need to be notified of service endpoint IP addresses whenever an NF registers or updates its profile. Another scenario in which the consumer NF or SCP needs to be updated with the IP addresses or IP endpoints of the service is when the IP addresses or IP endpoints change without a corresponding NF profile or service update. Even though IP addresses or IP endpoints are discoverable through DNS, there is no automated process for notifying service consumers when an IP address or IP endpoint associated with a service changes.

An additional problem associated with a network architecture that includes both 4G service endpoints is the inability to actively discover and maintain IP address information for 4G NFs and service endpoints associated with 4G NFs. Existing 4G service endpoint discovery procedures require that each consumer NF (4G or 5G) directly contact a DNS server to discover 4G NFs and detect changes in 4G NF status information. Requiring each consumer NF to directly communicate with DNS servers can be burdensome on the consumer NFs, as the consumer NFs must maintain timers corresponding to DNS response expiration periods and re-query a DNS server with a DNS response expiration occurs. In addition, there is currently no mechanism provided by DNS for the consumer NFs to detect when 4G NFs have scaled up, scaled down. Further, when a DNS server goes down, scales up, or scales down, each consumer NF must be reconfigured.

In light of these and other challenges, there exists a need for improved, methods, and non-transitory media to actively discover and maintain address information for 4G service endpoints.

SUMMARY

A method for discovering and tracking addresses associated with 4G service endpoints includes receiving, from a requesting node, a first domain name system (DNS) resolution or monitoring request including a fully qualified domain name (FQDN) of a 5G service endpoint. The method further includes querying a DNS server using the FQDN from the first DNS resolution request. The method further includes receiving, from the DNS server, a first response including an address associated with the 4G service endpoint and storing the address associated with the 4G service endpoint in a database. The method further includes communicating the address associated with the 4G service endpoint to the requesting node. The method further includes monitoring the FQDN for changes in address associated with the FQDN. The method further includes notifying the requesting node of the changes in address associated with the FQDN.

According to an aspect of the subject matter described herein, receiving the first DNS resolution request includes receiving the first DNS resolution request from a Diameter relay agent (DRA) or service communications proxy (SCP).

According to another aspect of the subject matter described herein, receiving the first DNS resolution request includes receiving the first DNS resolution request from a 4G or 5G consumer NF.

According to yet another aspect of the subject matter described herein, receiving the first DNS resolution request includes receiving the first DNS resolution request at a representational state transfer (REST) server interface provided by a DNS discoverer micro-service.

According to yet another aspect of the subject matter described herein, querying the DNS server includes querying the DNS server from a DNS discoverer micro-service separate from the consumer NF or SCP and the DNS server. In this context, "separate from" means that the DNS discoverer micro-service is implemented on a computing platform separate from a consumer NF or SCP that needs to resolve a domain name and also separate from a computing platform that hosts the DNS server. In an alternate implementation, the DNS discoverer micro-service may be implemented on the same computing platform as a consumer NF or an SCP.

According to yet another aspect of the subject matter described herein, storing the address associated with the producer NF service comprises storing the address in a database local to the DNS discoverer micro-service along with the time to live of each address received from the DNS Server.

According to yet another aspect of the subject matter described herein, for every address received from the DNS server along with a time to live value when stored in a record in the database, a timer is started for the time period received in time to live field.

According to yet another aspect of the subject matter described herein, monitoring the FQDN comprises: detecting expiration of a record storing the address associated with the producer NF service in the database; in response to detecting expiration of the record, querying the DNS server using the FQDN; receiving a second response from the DNS server; comparing an address in the second response to the address stored in the record in the database; and determining that a change in address associated with the FQDN has occurred in response to the address in the second response being different from the address stored in the record in the database.

According to yet another aspect of the subject matter described herein, the 4G service endpoint comprises an endpoint associated with 4G evolved packet core (EPC) network node.

According to another aspect of the subject matter described herein, the 4G EPC network node comprises one of a serving gateway (S-GW), a home subscriber server (HSS), an offline charging system (OFCS), an online charging system (OCS), a mobility management entity (MME), a policy and charging rules function (PCRF), a packet gateway (P-GW), and other 4G NFs.

According to yet another aspect of the subject matter described herein, monitoring the FQDN for changes address includes continually monitoring the FQDN for changes in address until stopped in response to a message from the requesting node to cease monitoring the FQDN.

According to yet another aspect of the subject matter described herein, the message from the requesting node to cease monitoring the FQDN comprises a second DNS resolution request including a DELETE method type, and, in response, ceasing monitoring the FQDN.

According to yet another aspect of the subject matter described herein, the DNS discoverer micro-service includes a representational state transfer (REST) server interface to cease the monitoring of FQDN from the requesting node.

According to yet another aspect of the subject matter described herein, a system for discovering and tracking producer network function (NF) service endpoints, comprises a computing platform including at least one processor. The system further includes a domain name system (DNS) discover micro-service located on the computing platform and implemented by the at least one processor for receiving,
from a requesting node, a first domain name system (DNS) resolution or monitoring request including a fully qualified domain name (FQDN) of a 4G service endpoint, querying a DNS server using the FQDN of the 4G service endpoint, receiving a first response from the DNS server, the first response including an address associated with the 4G service endpoint, storing the address associated with the 4G service endpoint in a database, communicating the address associated with the 4G service endpoint to the requesting node, monitoring the FQDN for changes in address associated with the FQDN, and notifying the requesting node of the changes in address associated with the FQDN.

According to yet another aspect of the subject matter described herein, the DNS discoverer micro-service is configured to receive the first DNS resolution request from a Diameter relay agent (DRA) or service communications proxy (SCP).

According to yet another aspect of the subject matter described herein, the DNS discoverer micro-service is configured to the first DNS resolution request from 4G or 5G consumer NF.

According to yet another aspect of the subject matter described herein, the DNS discoverer micro-service includes a representational state transfer (REST) server interface for receiving the first DNS resolution request from the requesting node.

According to yet another aspect of the subject matter described herein, the computing platform and the DNS discoverer micro-service are separate from the requesting node and the DNS server.

According to another aspect of the subject matter described herein, the database is local to the DNS discoverer micro-service.

According to yet another aspect of the subject matter described herein, the DNS discoverer micro-service includes a DNS records change discoverer for performing the monitoring of the FQDN by: detecting expiration of a record storing the address associated with the 4G service endpoint in the database; in response to detecting expiration of the record, querying the DNS server using the FQDN; receiving a second response from the DNS server; and comparing an address in the second response to the address stored in the record in the database; determining that a change in address associated with the FQDN has occurred in response to the address in the second response being different from the address or stored in the record in the database.

According to yet another aspect of the subject matter described herein, the DNS record change discoverer is configured to continually monitor the FQDN for changes address associated with the FQDN until stopped in response to a message from the requesting node to cease monitoring the FQDN.

According to yet another aspect of the subject matter described herein, a non-transitory computer readable medium having stored thereon executable instructions that when executed by a processor of a computer control the computer to perform steps is provided. The steps include receiving, from a requesting node, a first domain name system (DNS) resolution request including a fully qualified domain name (FQDN) of a 4G service endpoint. The steps include querying a DNS server using the FQDN of the 4G service endpoint from the first DNS resolution or monitoring request. The steps further include receiving a first response from the DNS server, the response including an address associated with the 4G service endpoint. The steps further include storing the address associated with 4G service endpoint in a database. The steps further include communicating the address associated with the 4G service endpoint to the requesting node. The steps further include monitoring the FQDN for changes in address associated with the FQDN. The steps further include notifying the requesting node of the changes in address associated with the FQDN.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1A:
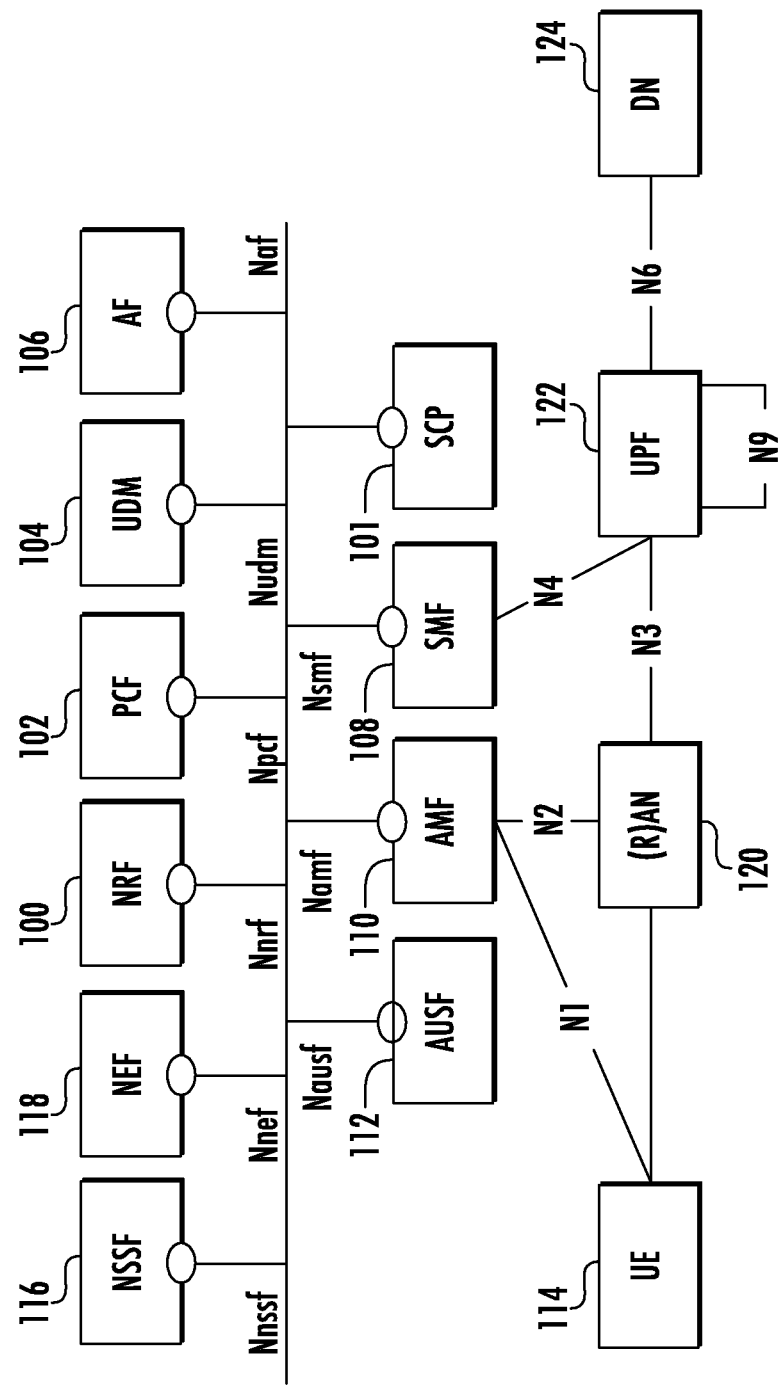
FIG. 1A is a network diagram illustrating an exemplary 5G network architecture.

The subject matter described herein relates to methods, systems, and computer readable media for discovering and actively tracking address information associated with 4G service endpoints. FIG. 1A is a block diagram illustrating an exemplary 5G system network architecture. The architecture in FIG. 1A includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JSON data structure defined in 3GPP TS 29.510. Table 1 shown below illustrates attributes of the NF profile as defined in 3GPP TS 29.510.

TABLE 1

NF Profile Definition

| Attribute name | Data type | P | Cardinality | Description |
|---|---|---|---|---|
| nfInstanceId | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) |
| heartBeatTimer | integer | C | 0 . . . 1 | Time in seconds expected between 2 consecutive heart-beat messages from an NF Instance to the NRF. It may be included in the registration request. When present in the request it shall contain the heartbeat time proposed by the NF service consumer. It shall be included in responses from NRF to registration requests (PUT) or in NF profile updates (PUT or PATCH). If the proposed heartbeat time is acceptable by the NRF based on the local configuration, it shall use the same value as in the registration request; otherwise the NRF shall override the value using a preconfigured value. |
| plmnList | array(PlmnId) | C | 1 . . . N | PLMN(s) of the Network Function (NOTE 7). |

TABLE 1-continued

NF Profile Definition

| Attribute name | Data type | P | Cardinality | Description |
|---|---|---|---|---|
| | | | | This IE shall be present if this information is available for the NF. If not provided, PLMN ID(s) of the PLMN of the NRF are assumed for the NF. |
| sNssais | array(Snssai) | O | 1 ... N | S-NSSAIs of the Network Function. If not provided, the NF can serve any S-NSSAI. When present this IE represents the list of S-NSSAIs supported in all the PLMNs listed in the plmnList IE. |
| perPlmnSnssaiList | array(PlmnSnssai) | O | 1 ... N | This IE may be included when the list of S-NSSAIs supported by the NF for each PLMN it is supporting is different. When present, this IE shall include the S-NSSAIs supported by the Network Function for each PLMN supported by the Network Function. When present, this IE shall override sNssais IE. (NOTE 9) |
| nsiList | array(string) | O | 1 ... N | NSI identities of the Network Function. If not provided, the NF can serve any NSI. |
| Fqdn | Fqdn | C | 0 ... 1 | FQDN of the Network Function (NOTE 1) (NOTE 2). For AMF, the FQDN registered with the NRF shall be that of the AMF Name (see 3GPP TS 23.003 [12] clause 28.3.2.5). |
| interPlmnFqdn | Fqdn | C | 0 ... 1 | If the NF needs to be discoverable by other NFs in a different PLMN, then an FQDN that is used for inter-PLMN routing as specified in 3GPP TS 23.003 [12] shall be registered with the NRF (NOTE 8). A change of this attribute shall result in triggering a "NF_PROFILE_CHANGED" notification from NRF towards subscribing NFs located in a different PLMN, but the new value shall be notified as a change of the "fqdn" attribute. |
| ipv4Addresses | array(Ipv4Addr) | C | 1 ... N | IPv4 address(es) of the Network Function (NOTE 1) (NOTE 2) |
| ipv6Addresses | array(Ipv6Addr) | C | 1 ... N | IPv6 address(es) of the Network Function (NOTE 1) (NOTE 2) |
| allowedPlmns | array(PlmnId) | O | 1 ... N | PLMNs allowed to access the NF instance. If not provided, any PLMN is allowed to access the NF. A change of this attribute shall not trigger a "NF_PROFILE_CHANGED" notification from NRF, and this attribute shall not be included in profile change notifications to subscribed NFs. |
| allowedNfTypes | array(NFType) | O | 1 ... N | Type of the NFs allowed to access the NF instance. If not provided, any NF type is allowed to access the NF. A change of this attribute shall not trigger a "NF_PROFILE_CHANGED" notification from NRF, and this attribute shall not be included in profile change notifications to subscribed NFs. |
| allowedNfDomains | array(string) | O | 1 ... N | Pattern (regular expression according to the ECMA-262 dialect [8]) representing the NF domain names allowed to access the NF instance. If not provided, any NF domain is allowed to access the NF. |

TABLE 1-continued

NF Profile Definition

| Attribute name | Data type | P | Cardinality | Description |
| --- | --- | --- | --- | --- |
| | | | | A change of this attribute shall not trigger a "NF_PROFILE_CHANGED" notification from NRF, and this attribute shall not be included in profile change notifications to subscribed NFs. |
| allowedNssais | array(Snssai) | O | 1 ... N | S-NSSAI of the allowed slices to access the NF instance. If not provided, any slice is allowed to access the NF. A change of this attribute shall not trigger a "NF_PROFILE_CHANGED" notification from NRF, and this attribute shall not be included in profile change notifications to subscribed NFs. |
| Priority | integer | O | 0 ... 1 | Priority (relative to other NFs of the same type) in the range of 0-65535, to be used for NF selection; lower values indicate a higher priority. If priority is also present in the nfServiceList parameters, those will have precedence over this value. (NOTE 4). The NRF may overwrite the received priority value when exposing an NFProfile with the Nnrf_NFDiscovery service. |
| Capacity | integer | O | 0 ... 1 | Static capacity information in the range of 0-65535, expressed as a weight relative to other NF instances of the same type; if capacity is also present in the nfServiceList parameters, those will have precedence over this value. (NOTE 4). |
| Load | integer | O | 0 ... 1 | Dynamic load information, ranged from 0 to 100, indicates the current load percentage of the NF. |
| Locality | string | O | 0 ... 1 | Operator defined information about the location of the NF instance (e.g. geographic location, data center) (NOTE 3) |
| udrInfo | UdrInfo | O | 0 ... 1 | Specific data for the UDR (ranges of SUPI, group ID . . .) |
| udmInfo | UdmInfo | O | 0 ... 1 | Specific data for the UDM (ranges of SUPI, group ID . . .) |
| ausfInfo | AusfInfo | O | 0 ... 1 | Specific data for the AUSF (ranges of SUPI, group ID . . .) |
| amfInfo | AmfInfo | O | 0 ... 1 | Specific data for the AMF (AMF Set ID, . . .) |
| smfInfo | SmfInfo | O | 0 ... 1 | Specific data for the SMF (DNN's, . . .) |
| upfInfo | UpfInfo | O | 0 ... 1 | Specific data for the UPF (S-NSSAI, DNN, SMF serving area, interface . . .) |
| pcfInfo | PcfInfo | O | 0 ... 1 | Specific data for the PCF |
| bsfInfo | BsfInfo | O | 0 ... 1 | Specific data for the BSF |
| chfInfo | ChfInfo | O | 0 ... 1 | Specific data for the CHF |
| nrfInfo | NrfInfo | O | 0 ... 1 | Specific data for the NRF |
| customInfo | object | O | 0 ... 1 | Specific data for custom Network Functions |
| recoveryTime | DateTime | O | 0 ... 1 | Timestamp when the NF was (re)started (NOTE 5) (NOTE 6) |
| nfServicePersistence | boolean | O | 0 ... 1 | If present, and set to true, it indicates that the different service instances of a same NF Service in this NF instance, supporting a same API version, are capable to persist their resource state in shared storage and therefore these resources are available after a new NF service instance supporting the same API version is selected by a NF Service Consumer (see 3GPP TS 23.527 [27]). |

TABLE 1-continued

NF Profile Definition

| Attribute name | Data type | P | Cardinality | Description |
| --- | --- | --- | --- | --- |
| | | | | Otherwise, it indicates that the NF Service Instances of a same NF Service are not capable to share resource state inside the NF Instance. |
| nfServices | array(NFService) | O | 1 . . . N | List of NF Service Instances. It shall include the services produced by the NF that can be discovered by other NFs, if any. |
| nfProfileChangesSupportInd | boolean | O | 0 . . . 1 | NF Profile Changes Support Indicator. See Annex B. This IE may be present in the NFRegister or NFUpdate (NF Profile Complete Replacement) request and shall be absent in the response. true: the NF Service Consumer supports receiving NF Profile Changes in the response. false (default): the NF Service Consumer does not support receiving NF Profile Changes in the response. Write-Only: true |
| nfProfileChangesInd | boolean | O | 0 . . . 1 | NF Profile Changes Indicator. See Annex B. This IE shall be absent in the request to the NRF and may be included by the NRF in NFRegister or NFUpdate (NF Profile Complete Replacement) response. true: the NF Profile contains NF Profile changes. false (default): complete NF Profile. Read-Only: true |
| defaultNotificationSubscriptions | array(DefaultNotificationSubscription) | O | 1 . . . N | Notification endpoints for different notification types. (NOTE 10) |

(NOTE 1):
At least one of the addressing parameters (fqdn, ipv4address or ipv6adress) shall be included in the NF Profile. If the NF supports the NF services with "https" URI scheme (i.e use of TLS is mandatory), then the FQDN shall be provided in the NF Profile or the NF Service profile (see clause 6.1.6.2.3). See NOTE 1 of Table 6.1.6.2.3-1 for the use of these parameters. If multiple ipv4 addresses and/or ipv6 addresses are included in the NF Profile, the NF Service Consumer of the discovery service shall select one of these addresses randomly, unless operator defined local policy of IP address selection, in order to avoid overload for a specific ipv4 address and/or ipv6 address.
(NOTE 2):
If the type of Network Function is UPF, the addressing information is for the UPF N4 interface.
(NOTE 3):
A requester NF may use this information to select a NF instance (e.g. a NF instance preferably located in the same data center).
(NOTE 4):
The capacity and priority parameters, if present, are used for NF selection and load balancing. The priority and capacity attributes shall be used for NF selection in the same way that priority and weight are used for server selection as defined in IETF RFC 2782 [23].
(NOTE 5):
The NRF shall notify NFs subscribed to receiving notifications of changes of the NF profile, if the NF recoveryTime or the nfStatus is changed. See clause 6.2 of 3GPP TS 23.527 [27],
(NOTE 6):
A requester NF may consider that all the resources created in the NF before the NF recovery time have been lost. This may be used to detect a restart of a NF and to trigger appropriate actions, e.g. release local resources. See clause 6.2 of 3GPP TS 23.527 [27].
(NOTE 7):
A NF may register multiple PLMN IDs in its profile within a PLMN comprising multiple PLMN IDs. If so, all the attributes of the NF Profile shall apply to each PLMN ID registered in the plmnList. As an exception, attributes including a PLMN ID, e.g. IMSI-based SUPI ranges, TAIs and GUAMIs, are specific to one PLMN ID and the NF may register in its profile multiple occurrences of such attributes for different PLMN IDs (e.g. the UDM may register in its profile SUPI ranges for different PLMN IDs).
(NOTE 8):
Other NFs are in a different PLMN if they belong to none of the PLMN ID(s) configured for the PLMN of the NRF.
(NOTE 9):
This is for the use case where an NF (e.g. AMF) supports multiple PLMNs and the slices supported in each PLMN are different. See clause 9.2.6.2 of 3GPP TS 38.413 [29].
(NOTE 10):
If notification endpoints are present both in the profile of the NF instance (NFProfile) and in some of its NF Services (NFService) for a same notification type, the notification endpoint(s) of the NF Services shall be used for this notification type.

As indicated in Table 1, the NF profile definition includes at least one of an FQDN, an IP version 4 address or an IP version 6 address. However, there is no requirement that the NF profile include individual IP addresses or IP endpoints associated with a producer NF service endpoint located on the producer NF service instance.

In FIG. 1A, any of the nodes (other than SCP 101 and NRF 101) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1A further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1A) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1A is a data network (DN) 124 through which UEs access data network services, such as Internet services.

Address information associated with service endpoints resident on any of the NFs illustrated in FIG. 1A that provide services can be tracked using the DNS discoverer microservice described herein. In addition, non-5G service endpoints that provide services under given FQDN may be discovered and tracked by the DNS discover micro-service described herein. Thus, the term "producer NF service endpoint" as used herein is intended to refer to a service endpoint present on any of the 5G or non-5G service provider nodes. Non-5G service provider nodes include 3G, 4G, or subsequent generation (post-5G) counterpart and non-3GPP service provider nodes.

As stated above, producer NFs register their NF profiles with the NRF. Consumer NFs can discover producer NFs that have registered to provide a specific service by obtaining the NF profiles from the NRF. Consumer NFs can communicate directly with NF service producer NFs. Alternatively, consumer NFs can communicate indirectly with producer NFs via the SCP. In the direct communications mode, the consumer NF performs discovery of the target producer NF either by local configuration or via the NRF. The consumer NF then communicates directly with the target service producer NF. In indirect communications mode, the consumer NF sends service request messages to the SCP, and the SCP may perform service discovery and selection of a producer NF on behalf of a consumer NF. In either the direct or indirect communications mode, the DNS discoverer micro-service described herein may receive DNS resolution request from the consumer NF or from the SCP, query a DNS server on behalf of the consumer NF or SCP, communicate the address information associated with producer NF service endpoints to the consumer NF or SCP, and continually monitor the FQDN received in the DNS resolution request for changes in address associated with the FQDN.

Figure 1B:
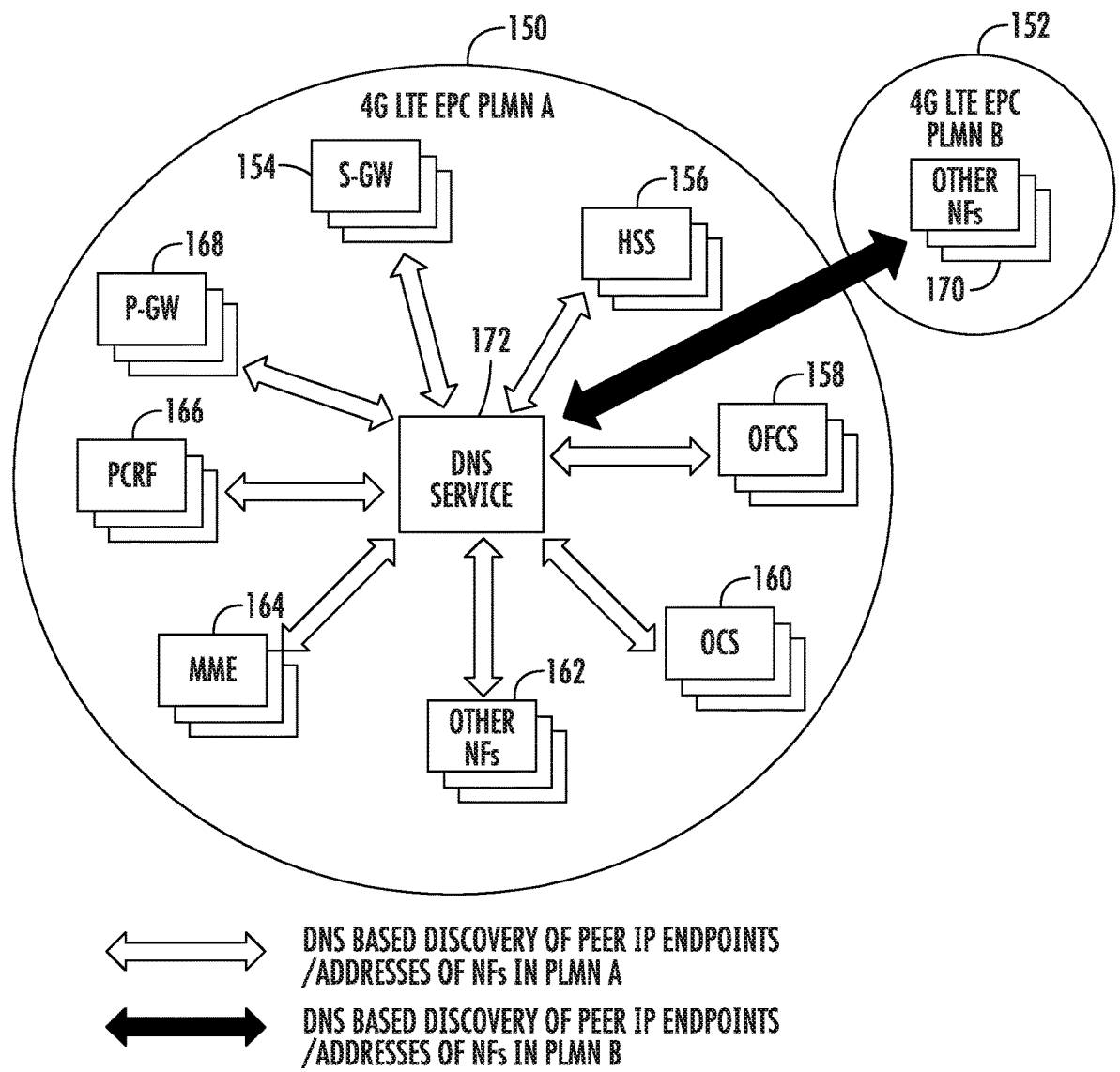
FIG. 1B illustrates an exemplary 4G evolved packet core (EPC) network architecture with two different public land mobile networks (PLMNs)

FIG. 1B illustrates an exemplary 4G evolved packet core (EPC) network architecture with two different public land mobile networks (PLMNs). In FIG. 1B, PLMN A 150 and PLMN B 152 are illustrated. PLMN A 150 includes plural EPC network nodes. In the illustrated example, the EPC network nodes include a serving gateway (S-GW) 154, a home subscriber server (HSS) 156, an offline charging system (OFCS) 158, an online charging system (OCS) 160, other NFs 162, a mobility management entity (MME) 164, a policy and charging rules function (PCRF) 166, and a packet gateway (P-GW) 168. PLMN 152 may also include 4G NFs 170, which can include any of the MNFs illustrated in PLMN 150.

Network nodes seeking to obtain service from 4G NFs 154-170 or service endpoints on 4G NFs 154-170 rely on DNS service 172 for service discovery and monitoring for changes in IP address. When a consumer, which could include any of the NFs illustrated in FIG. 1A or 1B, seeks to obtain a service from a 4G service endpoint, the consumer relies on DNS to determine the IP address of the endpoint. Using DNS reduces the need for manual configuration of service consumers with the IP addresses of 4G service endpoints and assists in traffic migration from one instance of an NF to another when the FQDN to IP address mapping changes, as DNS gracefully handles such changes. DNS responses may include a weight factor for each IP endpoint that can be set based on optional preferences. NFs can load balance in the case that an FQDN resolves to multiple IP addresses identifying multiple NF instances. For example, if a new instance of a P-GW is installed on a network, the new P-GW will be favored to be selected in attempt to balance traffic to existing P-GW instances. DNS responses include a validity timer for the IP endpoints/addresses received. These addresses are generally cached and used by the NFs for this expiry period to avoid DNS queries for every new request. Caching IP address mappings for the DNS expiration period saves processing bandwidth and latency over re-querying the DNS server for every new service request.

As stated above, challenges with such an approach that uses DNS to discover 4G service endpoints include the fact that DNS responses come with an expiry period, which must be tracked by each consumer NF in order to avoid a DNS query per service request. This puts additional burdens on the consumer NFs to maintain timers per resolved IP address. In the case where target NFs scale up (i.e., increasing the number of 4G service instances), additional IP endpoints and addresses are detected at the expiry because there is no way to actively detect this condition. In the case where target NFs have scaled down or changed IP addresses (in the case of migration), there is no graceful way to detect this change. Routing failures to dropped IP addresses trigger DNS rediscovery. DNS servers also go out of service for maintenance or scale up or scale down reasons. When this occurs, all of the NF instances that rely on the DNS service require reconfiguration to communicate with the scaled up or scaled down DNS instances. To avoid these and other difficulties, the subject matter described herein includes a DNS micro service, which will be described in more detail below.

Figure 2:
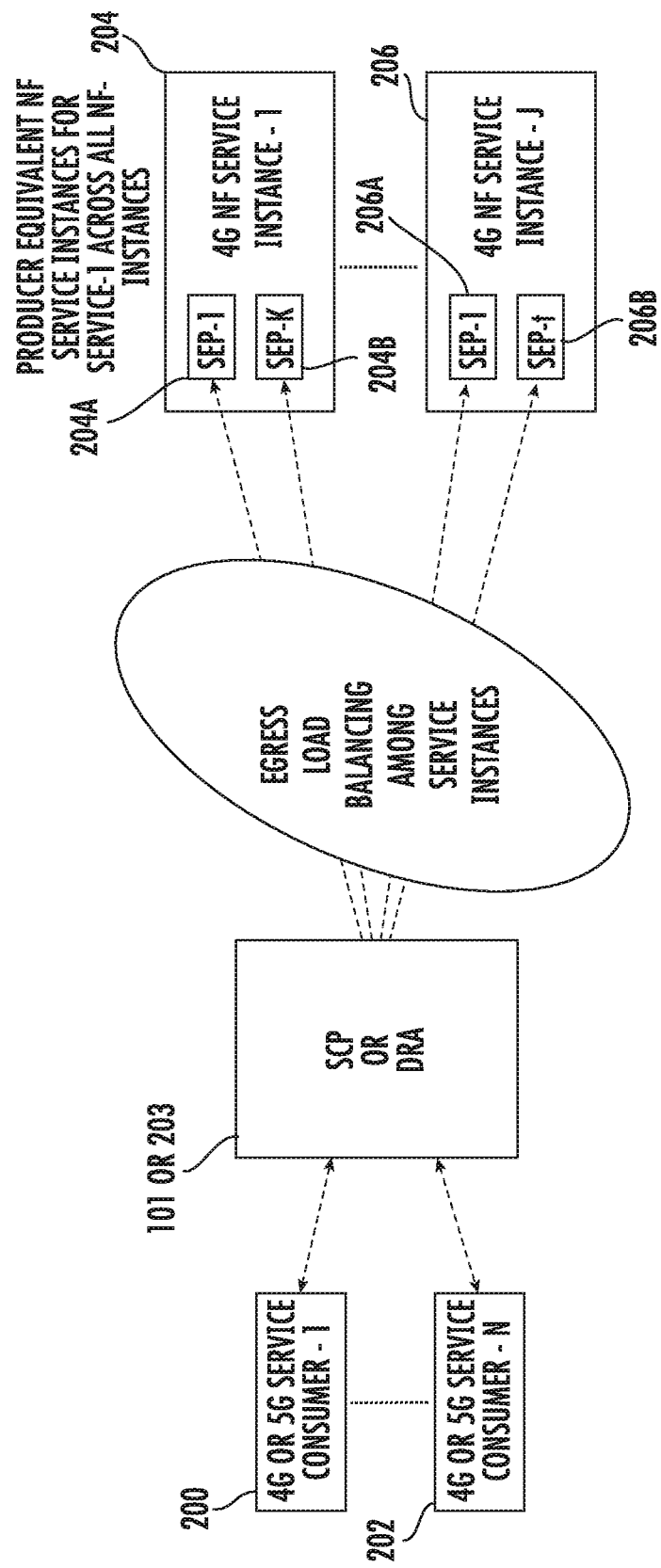
FIG. 2 is a network diagram illustrating load balancing by a service communications proxy among 5G producer NF service instances and service endpoints exposed by the 5G producer NF service instances.

One problem that occurs in the architecture illustrated in FIGS. 1A and 1B is that the service communication proxy, a Diameter relay agent (DRA), or consumer NF may have insufficient information to load balance among service endpoints resident on 4G NF service instances. FIG. 2 illustrates this problem. Referring to FIG. 2, service communications proxy 101 or DRA 203 resides between 4G or 5G consumer NFs 200 and 202 and 4G producer NFs 204 and 206. For example, if consumer NFs 200 and 202 are 4G NFs, then SCP 101 or DRA 203 will include DRA functionality, which includes routing Diameter messages based on Diameter layer information in the messages, including distributing such messages to 4G producer NFs 204 and 206. If consumer NFs 200 and 202 are 5G NFs, then SCP 101 or DRA 203 will include SCP functionality, which includes routing 5G messages based on IP addresses in the messages. In either case, SCP 101 or DRA 203 (as well as consumer NFs 200 and 202) may utilize the DNS discover microservice described herein to resolve FQDNs into IP addresses of 4G service endpoints and to monitor the FQDNs for changes in mappings between the FQDNs and IP addresses of 4G service endpoints. It is also possible that SCP or DRA 101 and 203 may include both SCP and DRA functionality. 4G producer NF 204 includes producer NF service endpoints 204A and 204B. 4G producer NF service instance 206 includes producer NF service endpoints 206A and 206B.

In operation, consumer NFs 200 and 202 connect to service communications proxy 101 or DRA 203, and service communications proxy 101 or DRA 203 load balances traffic among the producer NF service endpoints. Service communications proxy 101 or DRA 203 producer NF service endpoints for load balancing from the above-described NF profile (in the 5G case) or from DNS (in the 4G case) and NF service contents that producer NFs 204 and 206 have registered with NRF 100 (for the 5G case only). However, as indicated above, because registering the address information associated with the individual service endpoints is not required, the load balancing performed by SCP 101 or DRA 203 may not evenly balance a load among service endpoints.

As indicated above, in one scenario, a producer NF service instance may only register a fully qualified domain name at the NF service level. In another scenario, no IP endpoints and no fully qualified domain name may be registered at the NF service level and only the fully qualified domain name may be registered at the NF instance level. In either of these scenarios, the service communications proxy lacks sufficient information for adequate load balancing.

The consumer NF, DRA, or service communications proxy may determine the IP endpoints of service instances directly by the NF service or NF service instance through DNS-SRV records. In another example, the IP addresses may be exposed by the NF service or NF service instance through DNS A/AAAA records and ports are taken as SCP configuration.

The addresses of producer NF service endpoints need to be known to the consumer NF, DRA, or SCP when any NF registers or updates a registration. The addresses of producer NF service endpoints also need to be known when the IP addresses or IP endpoints change without any NF profile or NF service updates. The consumer NF, DRA, or SCP needs to track these changes for continued routing and load balancing purposes. The DNS discoverer micro-service described herein discovers addresses of producer NF service endpoints and monitors FQDNs for changes in address associated with the FQDN.

Figure 3:
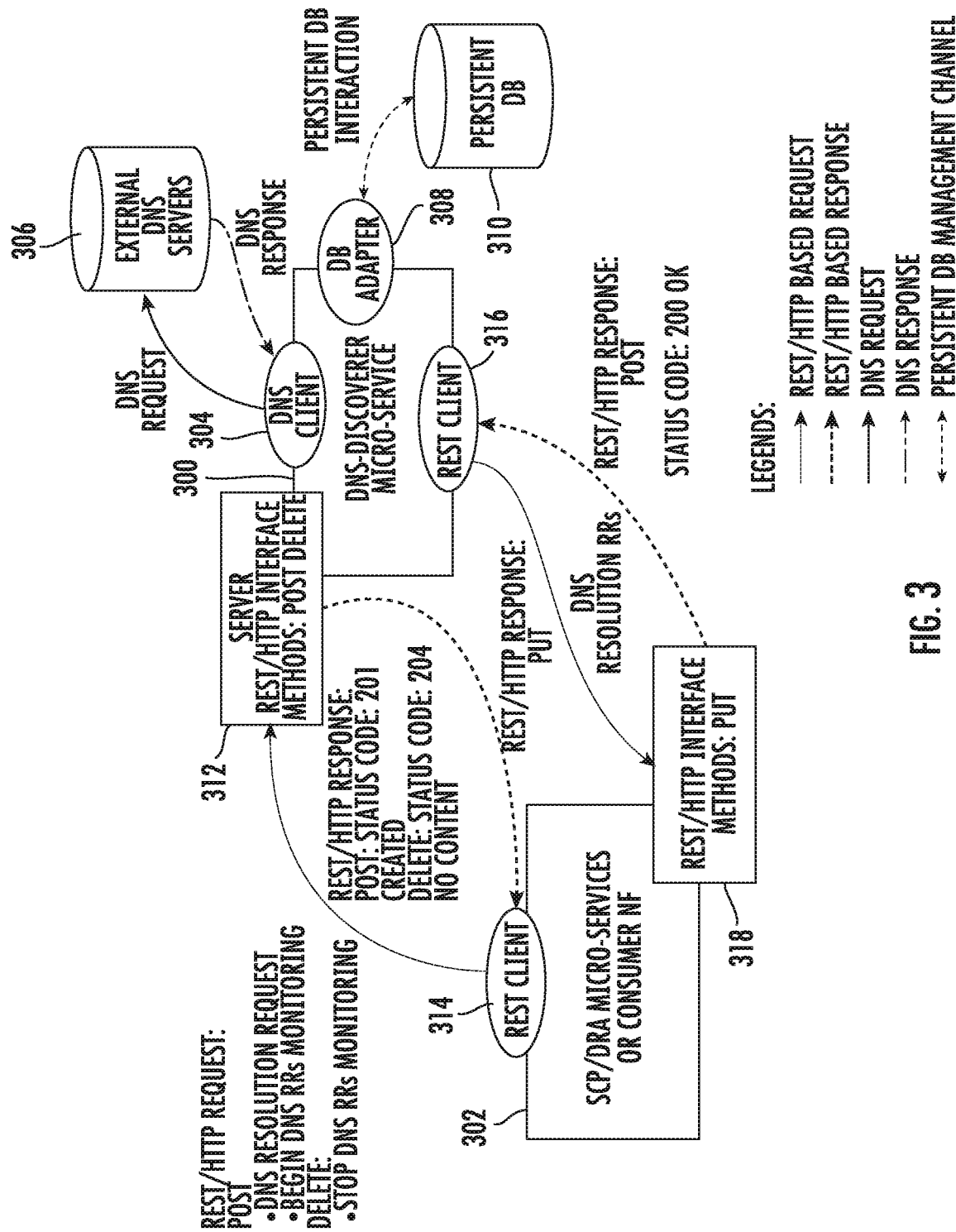
FIG. 3 is a network diagram illustrating a DNS discoverer micro-service that enables a consumer NF or SCP to discover address information associated with producer NF service endpoints.

As indicated above, the DNS discoverer (DNS-D) microservice solves at least some of the problems associated with discovery and tracking of service endpoints. The DNS discoverer micro-service queries DNS servers to obtain address information for producer NF service endpoints and provides that information to an SCP, DRA, or consumer NF. FIG. 3 is a network diagram illustrating a network architecture that includes the DNS discoverer micro-service. Referring to FIG. 3, DNS discoverer micro-service 300 may be implemented on a computing platform separate from or the same as SCP/DRA micro-services or consumer NF 302. DNS discoverer micro-service 300 includes a DNS discoverer DNS client 304 that interfaces with external DNS servers 306. DNS discoverer micro-service 300 also includes a database adapter 308 that maintains NF service endpoint information in a persistent database 310. DNS discoverer micro-service 300 includes a DNS discoverer server interface 312 that exposes the DNS discoverer microservice to SCP/DRA micro-services or consumer NF 302 or non-5G service consumers. In the illustrated example, server interface 312 is a representational state transfer (REST) interface that interfaces with a REST client 314 provided by SCP/DRA micro-services or consumer NF 302. DNS discoverer micro-service 300 further includes a DNS discoverer REST client 316 that interfaces with a server interface 318 of SCP/DRA micro-services or consumer NF 302.

DNS discoverer micro-service 300 can be used to resolve the challenge(s) identified above. In one example, DNS discoverer micro-service 300 may expose a REST/HTTP interface to listen for DNS resolution/monitoring requests from an SCP, DRA, 4G or 5G NF, or any other service consumer(s). Consumer(s) send DNS requests as HTTP POST messages with callback uniform resource indicators (URIs) where DNS responses are expected. Being an asynchronous service, DNS discoverer micro-service 300 sends back a 201 created message indicating a request is accepted. DNS discoverer micro-service 300 queries external DNS servers with the requested FQDN. After getting successful DNS resolution from these external DNS servers, DNS discoverer micro-service 300 sends a DNS response to the callback URI received in a DNS resolution request as an HTTP PUT request. DNS discoverer micro-service 300 caches/stores the DNS query responses from external DNS server(s) and the times to live (TTLs) (received in the responses from the DNS servers) to enable DNS change monitoring (discussed below).

DNS discoverer micro-service 300 continually monitors (until stopped) all the requested FQDNs for the TTLs received in DNS query responses. DNS responses from external DNS servers are matched at every iteration with stored responses. Differences are indicated to the consumers in the callback URI as an HTTP PUT request. Consumer(s) may opt to stop monitoring by sending an HTTP DELETE request message to DNS discover micro-service 300.

Figure 4:
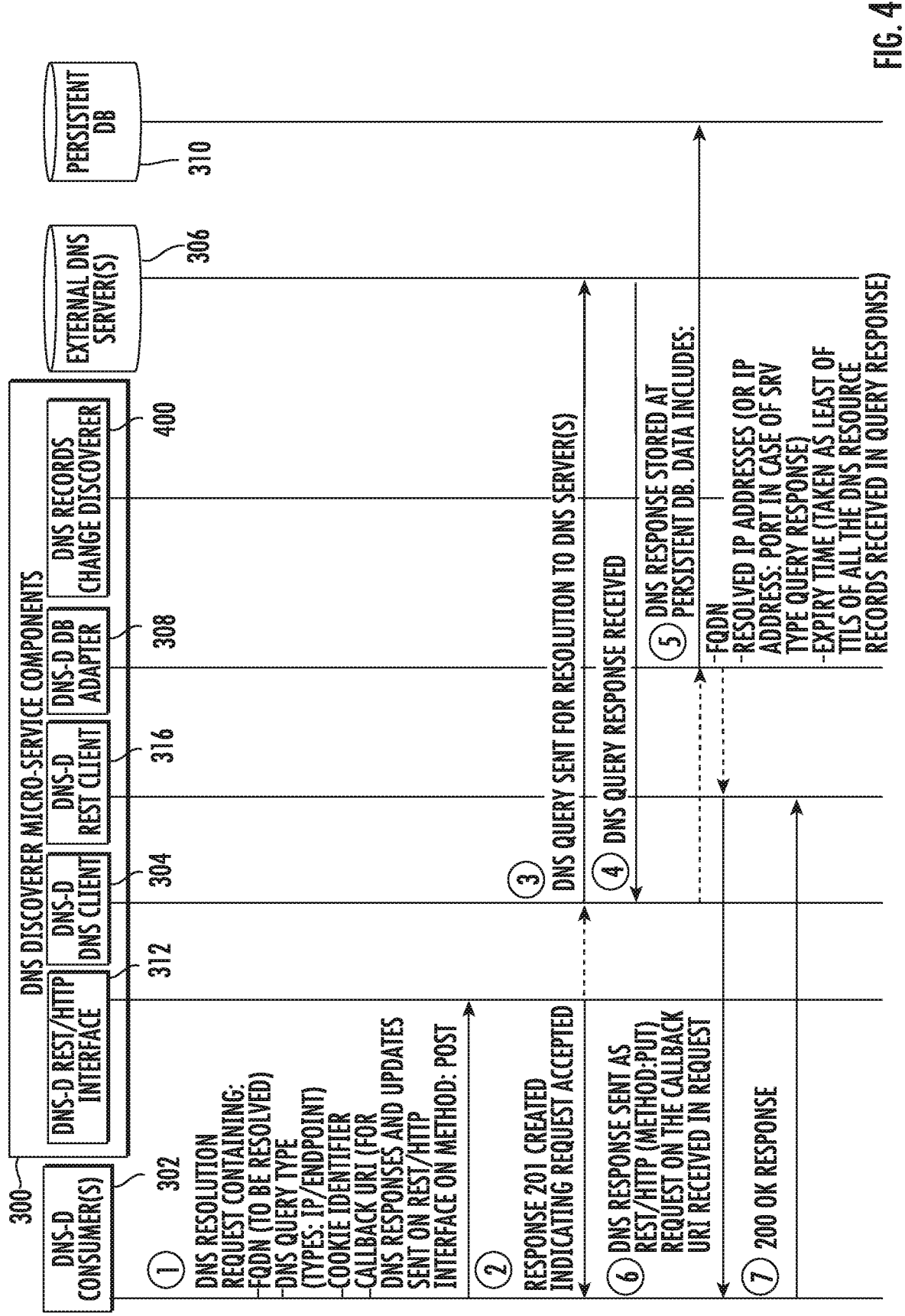
FIG. 4 is a call flow diagram illustrating exemplary messaging for obtaining address information for producer NF service endpoints using a DNS discoverer micro-service.

FIG. 4 is a call flow diagram illustrating DNS request servicing performed by DNS discoverer micro-service 300. The DNS discoverer micro-service 300 includes the components illustrated in and described above with regard to FIG. 3. In addition to the components illustrated in FIG. 3, DNS discoverer micro-service 300 includes a DNS records change discoverer 400 that monitors requested fully qualified domain names for the time to live values received in DNS query responses, re-queries DNS servers 306 when TTLs have expired, and communicates changes in resolved IP addresses or IP endpoints to consumer NFs, SCPs, or non-5G service consumers.

Referring to the call flow in FIG. 4, in line 1, a DNS consumer, such as SCP/DRA micro-services or consumer NF 302, sends a DNS resolution request to server interface of DNS discoverer micro-service 300. The DNS resolution request includes the FQDN to be resolved, the DNS query type, where the query type indicates an IP address or an IP endpoint, a cookie identifier, and a callback URI for DNS responses and updates sent on DNS discoverer REST client 316 to the querying DNS consumer.

In line 2 of the call flow diagram, DNS discoverer server interface 312 sends a response indicating that the request has been received and accepted.

In line 3 of the call flow diagram, DNS client component 304 of DNS discoverer micro-service 300 sends a query to external DNS servers 306 to resolve the fully qualified domain name in the DNS resolution request.

In line 4 of the call flow diagram, DNS servers 306 respond to DNS client 304 with a response to the DNS query. The response may include one or more IP addresses or IP endpoints that reside on a producer NF service instance corresponding to the FQDN in the DNS query.

In line 5 of the call flow diagram, DNS client component 304 communicates the IP address or IP endpoint information to DNS discoverer database adapter 308 and DNS discoverer database adapter 308 forwards the response to persistent database 310. The response includes the fully qualified domain name from the DNS resolution request, the resolved IP address (or IP addresses and ports depending on the type of response), and expiration time, which is the lowest TTL value of all of the TTL values of DNS resource records received in the query response.

In line 6, DNS discoverer database adapter 308 sends a message to DNS discoverer REST client 316 indicating that the database record has been created, and DNS discoverer client 316 sends the DNS response to SCP micro-services or consumer NF 302. The DNS response is sent on the callback URI received in the request. In line 7, SCP/DRA micro-services or consumer NF 302 sends a 200 OK response to DNS discoverer REST client 316.

Figure 5:
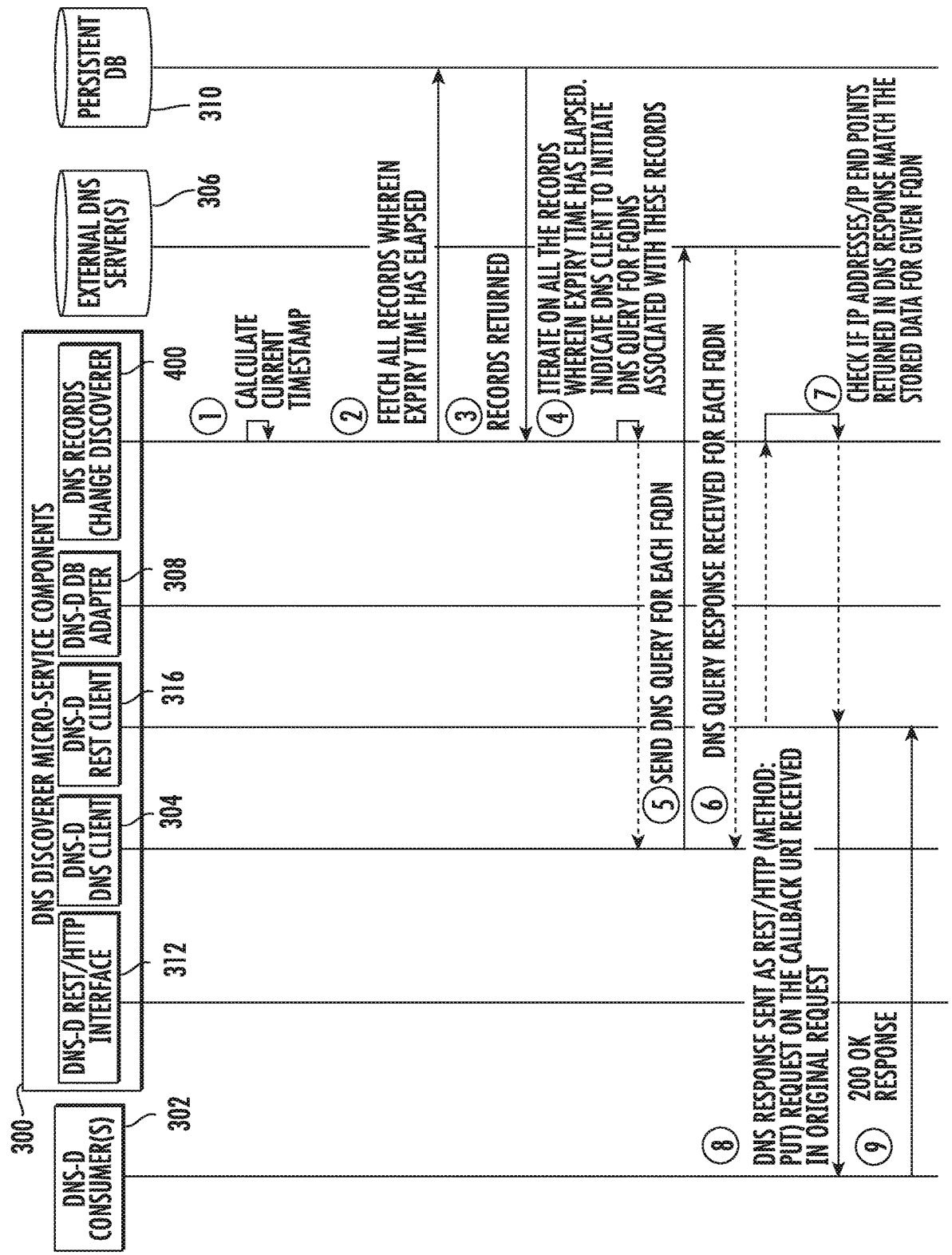
FIG. 5 is a call flow diagram illustrating a DNS change monitor and control flow using the DNS discoverer micro-service.

DNS records change discoverer 400 detects changes in resolved IP addresses or IP endpoints corresponding to a monitored FQDN. DNS records change discoverer 400 may periodically fetch all DNS records from storage and identify any records where the TTLs received in the DNS query responses have lapsed. For each record where the TTL has lapsed, DNS records change discoverer 400 may re-query the external DNS servers to determine any changes. If any changes have occurred, no further action is required. If a change has occurred, DNS records change discoverer 400 may notify consumer NFs or SCPs that are subscribed to the given service through a REST/HTTP PUT request on the call back URI received in the original DNS request. FIG. 5 is a call flow diagram illustrating a DNS change monitoring call flow. Referring to FIG. 5, in line 1, DNS records change discoverer 400 calculates the current timestamp. In line 2, DNS records change discoverer 400 queries persistent database 310 for all records that have a TTL or expiry time that has lapsed. In line 3 of the call flow diagram, persistent database 310 returns DNS records with lapsed call flows to DNS records change discoverer 400.

In line 4 of the call flow diagram, DNS records change discoverer 400 notifies DNS discoverer client 304 of each FQDN for which the TTL has lapsed. In line 5, DNS discoverer client 304 queries external DNS servers 306 for each FQDN for which the TTL has lapsed. In line 6 of the call flow diagram, DNS discoverer DNS client 304 receives a DNS query response for each FQDN queried in line 5. In line 7, DNS discoverer DNS client 304 notifies DNS records change discoverer of the IP addresses or IP endpoints received in the responses in line 6. DNS records change discoverer 400 determines whether the IP addresses or IP endpoints received match the stored data for each FQDN. If the IP addresses or IP endpoints match, no further action is required on the part of DNS record change discoverer 400. However, if the IP addresses or IP endpoints do not match, in line 8, DNS records change discoverer 400 communicates the changed IP addresses or IP endpoints to DNS discoverer REST client 316. DNS discoverer REST client 316 informs SCP/DRA micro-services or consumer NF 302 of the change in IP addresses or IP endpoints using an HTTP put request on the call back URI received in the original request. In line 9 of the call flow diagram, SCP/DRA micro-services or consumer NF 302 acknowledge receipt of the DNS responses in line 8.

Figure 6:
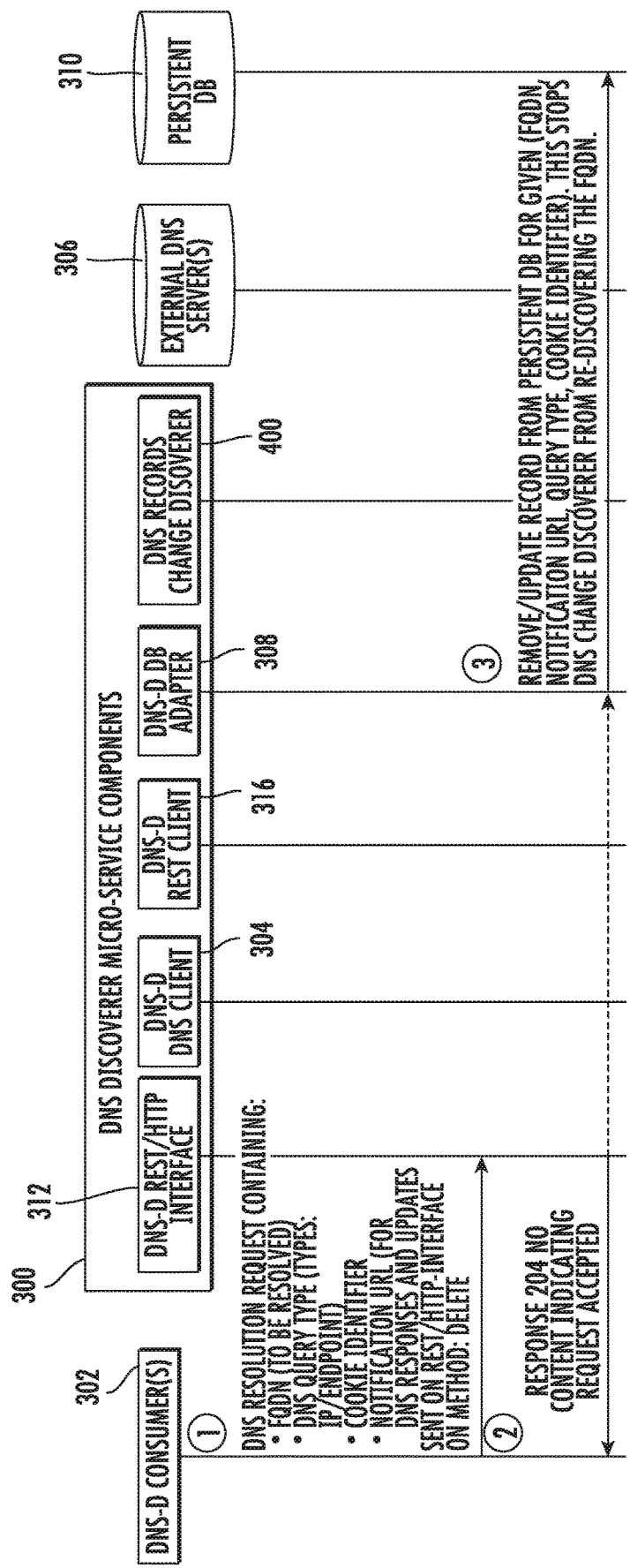
FIG. 6 is a call flow diagram illustrating a stop DNS call flow using a DNS discoverer micro-service.

Another operation performed by DNS discoverer micro-service 300 is to stop DNS monitoring, for example, when a 4G or 5G consumer NF, DRA, or SCP notifies DNS discoverer micro-service 300 that the 4G or 5G consumer NF, DRA or SCP desires to stop monitoring a given FQDN. FIG. 6 illustrates such a call flow. Referring to the call flow in FIG. 6, in line 1, DRA/SCP micro-services or consumer NF 302 sends a DNS resolution request with the FQDN to be resolved but specifying the delete method to stop DNS monitoring for the FQDN. In line 2 of the call flow diagram, DNS discoverer server interface 312 responds to the client indicating that the request has been accepted. In line 3 of the call flow diagram, DNS discoverer server interface 312 notifies DNS discoverer database adapter 308 that the consumer desires to cease monitoring the FQDN. DNS discoverer database adapter 308 sends a message to persistent database 310 to remove or update the record from persistent database 310 corresponding to the FQDN and notification URL specified in the original DNS resolution request. The message in line 3 will stop the DNS records change discoverer 400 from re-querying DNS servers 306 for the FQDN for this particular consumer.

Figure 7:
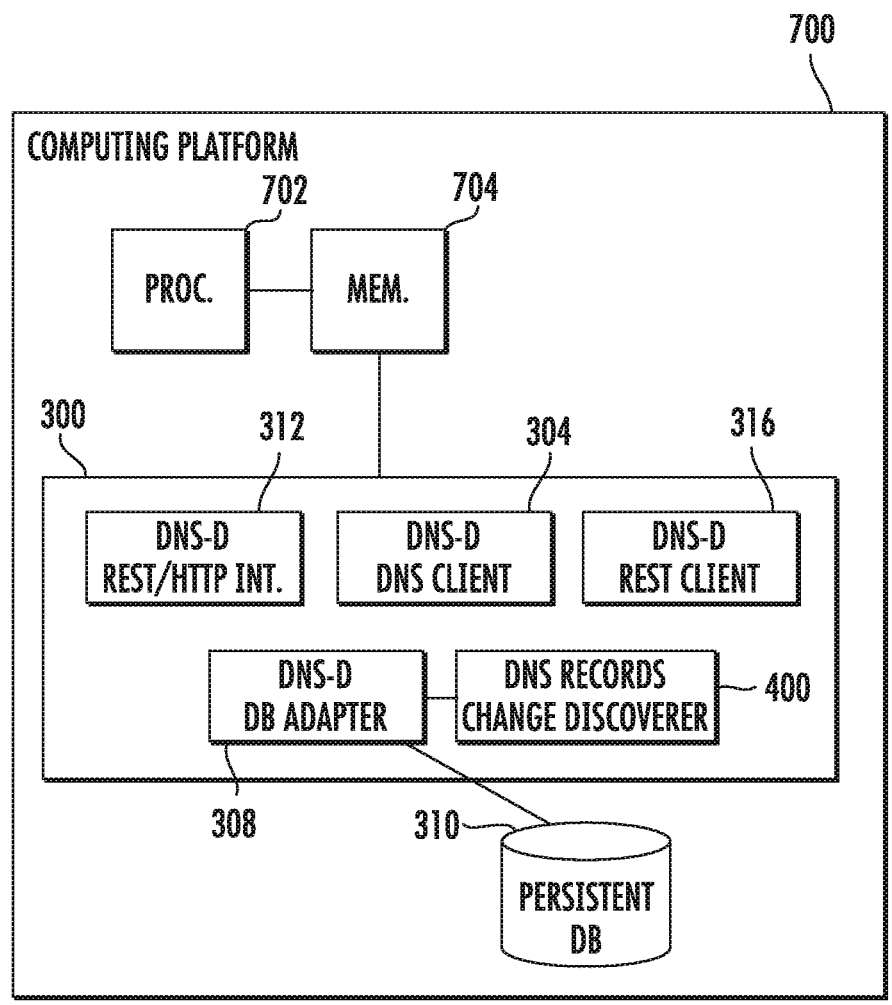
FIG. 7 is a block diagram illustrating a network node implementing a DNS discoverer micro-service.

FIG. 7 is a block diagram illustrating an exemplary architecture for a computing platform including DNS discoverer micro-service 300. Referring to FIG. 7, computing platform 700 includes at least one processor 702 and a memory 704. DNS discoverer micro-service 300 may be implemented by executable instructions embodied in memory 704. In the illustrated example, DNS discoverer micro-service 300 includes DNS discoverer server interface 312, DNS discoverer DNS client 304, DNS discoverer REST client 316, DNS discoverer database adapter 308, and DNS records change discoverer 400. Persistent database 310 may also reside in computing platform 700 for storing the IP addresses or IP endpoints for resolved FQDNs.

Figure 8:
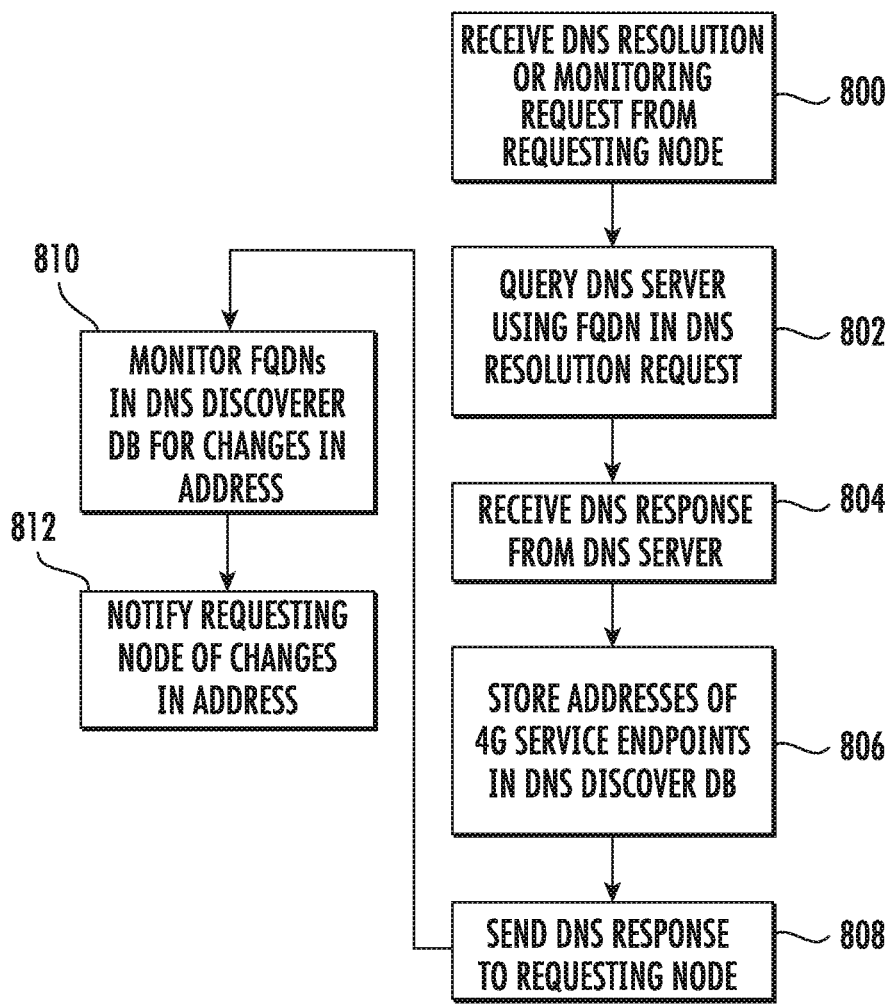
FIG. 8 is a flow chart illustrating an exemplary process for discovering and monitoring address information associated with 5G and non-5G service endpoints using the DNS discoverer micro-service.

FIG. 8 is a flow chart illustrating an exemplary process for actively discovering and tracking address information associated with 5G and non-5G service endpoints. Referring to FIG. 8, in step 800, a DNS resolution or monitoring request is received from a requesting node. For example, DNS discoverer micro-service 300 may receive a DNS resolution or monitoring request with an FQDN from a DNS discoverer consumer, such as an SCP, a DRA, a 4G NF, or a 5G NF. The DNS resolution or monitoring request may include the FQDN of a 4G service endpoint.

In step 802, a DNS server is queried using the FQDN in the DNS resolution request. For example, DNS discoverer micro-service 300 may query external DNS servers 306 using an FQDN in a DNS request received from a DNS discoverer consumer.

In step 804, a DNS response is received from the DNS server and, in step 806, the addresses of 4G service endpoints are stored in the DNS discoverer database (i.e., in persistent database 310). For example, DNS discoverer micro-service 300 may receive DNS responses from DNS servers 306 and store the IP addresses or IP endpoints associated with producer NF service endpoints in database 310. In one example, the DNS resolution request from DNS discoverer micro-service 300 may be a DNS-A resolution request, and DNS servers 306 may return an IPv4 address or addresses corresponding to a service endpoint or endpoints associated with the FQDN. In another example, the DNS resolution request may be a DNS-AAAA request, and DNS servers 306 may return an IPv6 address or addresses corresponding to a service endpoint or endpoints associated with the FQDN. In yet another example, the DNS resolution request may be a DNS-SRV request, and DNS servers may return an IP address(es) and port number(s) corresponding to a service endpoint or endpoints associated with the FQDN.

In step 808, a DNS response is sent to the requesting node. For example, DNS discoverer micro-service 300 may send a response to the requesting node including addresses associated with producer NF service endpoints received in the DNS response from DNS servers 306.

In step 810, FQDNs in the DNS discoverer database are monitored for changes in address. For example, DNS records change discoverer 400 may, for each FQDN whose TTL has expired in database 310, query external DNS servers 306 to determine any IP address or IP endpoint changes.

In step 812, the requesting node is notified of any changes in IP address or IP endpoint associated with the FQDN. For example, DNS records change discoverer 400 may notify SCP/DRA micro-services or consumer NF 302 of any detected changes in IP address(es) or IP endpoints associated with an FQDN for which SCP/DRA micro-services or consumer NF 302 has queried DNS discoverer micro-service 300

Thus, the subject matter described herein includes a DNS discoverer micro-service that discovers IP addresses or IP endpoints associated with 4G service endpoints and monitors FQDNs for changes in such addresses. One advantage of such a service is the fact that 4G and 5G consumer NFs, DRAs, and SCPs are not required to discover or actively monitor 4G NFs for changes in IP addresses or IP endpoints associated with a service. The consumer NF, DRA, or SCP is only required to learn the FQDN of a service and communicate the FQDN to the DNS discoverer micro-service. In addition, because the DNS discoverer micro-service actively monitors FQDNs for changes in IP address or IP endpoint, load balancing by nodes, such as DRAs, SCPs, and 4G and 5G consumer NFs, will be more evenly distributed among producer NF service endpoints.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for discovering and tracking addresses associated with 4G service endpoints, the method comprising:
receiving a first domain name system (DNS) resolution or monitoring request from a requesting node including a fully qualified domain name (FQDN) of a 4G service endpoint;
querying a DNS server using a fully qualified domain name (FQDN) using the FQDN of the 4G service endpoint extracted from the first DNS resolution or monitoring request;
receiving a first response from the DNS server, the first response including an address associated with a 4G service endpoint associated with the FQDN;
storing the address associated with the 4G service endpoint in a database;
communicating the address associated with the 4G service endpoint to the requesting node;
monitoring the FQDN for changes in address associated with the FQDN, wherein monitoring the FQDN comprises:
detecting expiration of a record storing the address associated with the 4G service endpoint in the database;
in response to detecting expiration of the record, querying the DNS server using the FQDN;
receiving a second response from the DNS server;
comparing an address in the second response to the address associated with the FQDN stored in the record in the database; and
determining that a change in address associated with the FQDN has occurred in response to the address in the second response being different from the address associated with the FQDN stored in the record in the database; and
notifying the requesting node of the changes in address associated with the FQDN.

2. The method of claim 1 wherein receiving the first DNS resolution or monitoring request from a requesting node includes receiving the first DNS resolution or monitoring request from a Diameter relay agent (DRA) or service communications proxy (SCP).

3. The method of claim 1 wherein receiving the first DNS resolution or monitoring request from a requesting node includes receiving the first DNS resolution or monitoring request from a 4G or 5G consumer NF.

4. The method of claim 1 wherein querying the DNS server includes querying the DNS server from a DNS discoverer micro-service separate from the requesting node and the DNS server.

5. The method of claim 4 wherein storing the address associated with the 4G service endpoint comprises storing the address in a database local to the DNS discoverer micro-service.

6. The method of claim 1 wherein monitoring the FQDN for changes in address includes continually monitoring the FQDN for changes in address until stopped in response to a message from the requesting node to cease monitoring the FQDN.

7. The method of claim 1 wherein the 4G service endpoint comprises an endpoint associated with 4G evolved packet core (EPC) network node.

8. The method of claim 7 wherein the 4G EPC network node comprises one of a serving gateway (S-GW), a home subscriber server (HSS), an offline charging system (OFCS), an online charging system (OCS), a mobility management entity (MME), a policy and charging rules function (PCRF), and a packet gateway (P-GW).

9. A system for discovering and tracking addresses associated with 4G service endpoints, the system comprising:
  a computing platform including at least one processor; and
  a domain name system (DNS) discover micro-service located on the computing platform and implemented by the at least one processor for receiving a first domain name system (DNS) resolution or monitoring request from a requesting node, querying a DNS server using a fully qualified domain name (FQDN) of a 4G service endpoint from the first DNS resolution or monitoring request, receiving a first response from the DNS server, the first response including an address associated with the 4G service endpoint associated with the FQDN, storing the address associated with the 4G service endpoint in a database, communicating the address associated with the 4G service endpoint to the requesting node, monitoring the FQDN for changes in address associated with the FQDN, and notifying the requesting node of the changes in address associated with the FQDN, wherein the DNS discoverer micro-service includes a DNS records change discoverer for performing the monitoring of the FQDN by:
  detecting expiration of a record storing the address associated with the 4G service endpoint in the database;
  in response to detecting expiration of the record, querying the DNS server using the FQDN;
  receiving a second response from the DNS server;
  comparing an address in the second response to the address associated with the 4G service endpoint stored in the record in the database; and
  determining that a change in address associated with the FQDN has occurred in response to the address in the second response being different from the address associated with the 4G service endpoint stored in the record in the database.

10. The system of claim 9 wherein the DNS discoverer micro-service is configured to receive the first DNS resolution or monitoring request from a Diameter relay agent (DRA) or service communications proxy (SCP).

11. The system of claim 9 wherein the DNS discoverer micro-service is configured to receive the first DNS resolution or monitoring request from a 4G or 5G consumer NF.

12. The system of claim 9 wherein the DNS discoverer micro-service includes a representational state transfer (REST) server interface for receiving the first DNS resolution or monitoring request from the requesting node.

13. The system of claim 9 wherein the computing platform and the DNS discoverer micro-service are separate from the requesting node and the DNS server.

14. The system of claim 13 wherein the database is local to the DNS discoverer micro-service.

15. The system of claim 9 wherein the DNS records change discoverer is configured to continually monitor the FQDN for changes in address until stopped in response to a message from the requesting node to cease monitoring the FQDN.

16. The system of claim 9 wherein the 4G service endpoint comprises an endpoint associated with 4G evolved packet core (EPC) network node.

17. The system of claim 16 wherein the 4G EPC network node comprises one of a serving gateway (S-GW), a home subscriber server (HSS), an offline charging system (OFCS), an online charging system (OCS), a mobility management entity (MME), a policy and charging rules function (PCRF), and a packet gateway (P-GW).

18. A non-transitory computer readable medium having stored thereon executable instructions that when executed by a processor of a computer control the computer to perform steps comprising:
  receiving, from a requesting node, a first domain name system (DNS) resolution or monitoring request including a fully qualified domain name (FQDN) of a 4G service endpoint;
  querying a DNS server using the FQDN of the 4G service endpoint from the first DNS resolution or monitoring request;
  receiving a first response from the DNS server, the response including an address associated with the 4G service endpoint;
  storing the address associated with the 4G service endpoint in a database;
  communicating the address associated with the 4G service endpoint to the requesting node;
  monitoring the FQDN for changes in address associated with the FQDN, wherein monitoring the FQDN comprises:
    detecting expiration of a record storing the address associated with the 4G service endpoint in the database;
    in response to detecting expiration of the record, querying the DNS server using the FQDN;
    receiving a second response from the DNS server;
    comparing an address in the second response to the address associated with the FQDN stored in the record in the database; and
  determining that a change in address associated with the FQDN has occurred in response to the address in the second response being different from the address associated with the FQDN stored in the record in the database; and
  notifying the requesting node of the changes in address associated with the FQDN.

* * * * *